(12) United States Patent
Nguyen et al.

(10) Patent No.: US 10,855,104 B2
(45) Date of Patent: Dec. 1, 2020

(54) DYING GASP POWER APPARATUS

(71) Applicant: Cisco Technology, Inc., San Jose, CA (US)

(72) Inventors: Dean Nguyen, Milpitas, CA (US); Matt Howard, San Jose, CA (US); Michael Grant, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 174 days.

(21) Appl. No.: 15/920,488

(22) Filed: Mar. 14, 2018

(65) Prior Publication Data

US 2019/0288549 A1  Sep. 19, 2019

(51) Int. Cl.
*H02J 9/06*   (2006.01)
*H02J 1/02*   (2006.01)
*H02J 1/10*   (2006.01)

(52) U.S. Cl.
CPC .............. *H02J 9/061* (2013.01); *H02J 1/02* (2013.01); *H02J 1/108* (2013.01)

(58) Field of Classification Search
CPC .............. H02J 1/02; H02J 1/108; H02J 9/061
USPC ......................................................... 307/82
See application file for complete search history.

(56) References Cited

U.S. PATENT DOCUMENTS

| 7,098,557 | B2* | 8/2006 | Swanson .................. H02J 7/345 307/46 |
| 7,573,941 | B2 | 8/2009 | Yang |
| 7,734,432 | B2 | 6/2010 | Chuang |
| 7,746,877 | B2 | 6/2010 | Trethewey |
| 7,940,118 | B1* | 5/2011 | Forghani-zadeh ........ G05F 1/56 327/536 |
| 8,247,924 | B1 | 8/2012 | Zoller |
| 9,857,859 | B2* | 1/2018 | Morning-Smith .... G06F 1/3206 |
| 2018/0301988 | A1* | 10/2018 | Hall ...................... H02M 3/335 |

FOREIGN PATENT DOCUMENTS

EP   3009910   4/2010

\* cited by examiner

*Primary Examiner* — Michael R. Fin

(57) ABSTRACT

In one embodiment, a power apparatus, includes at least one first and second power supply to receive power from a main power supply, the at least one first power supply including at least one first input capacitor to smooth voltage ripples, a voltage monitor to monitor voltage provided by the main power supply, and cause enablement and/or disablement of at least one part of the at least one first power supply according to the voltage provided by the main power supply, and at least one first blocking and passing component configured to selectively channel energy from the main power supply to charge the at least one first input capacitor during a time when the at least one part is enabled, and channel energy from the at least one first input capacitor to the at least one second power supply during a time when the at least one part is disabled.

20 Claims, 5 Drawing Sheets

DYING GASP POWER APPARATUS

TECHNICAL FIELD

The present disclosure generally relates to a power supply apparatus, and more specifically, to a power supply apparatus providing energy for a dying gasp event.

BACKGROUND

A system may need a dying gasp circuit, which keeps the system running for a set period of time after input power has been disconnected. When designing a dying gasp or backup power circuit utilizing a large capacitor bank for energy storage, the power required during a shutdown period commonly requires specific power rails (output lines) in the system to be kept in regulation for the system firmware to communicate that a power outage has occurred. The remaining power rails in the system will inadvertently and continuously burn precious backup power during this period and force the designer to size the backup capacitor bank significantly larger to account for these losses.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a power apparatus, including at least one first power supply configured to receive power from a main power supply, the at least one first power supply including at least one first input capacitor to smooth voltage ripples and store energy, at least one second power supply configured to receive power from the main power supply, a voltage monitor configured to monitor a voltage provided by the main power supply to the power apparatus, the voltage monitor being configured to cause enablement and/or disablement of at least one part of the at least one first power supply the voltage provided by the main power supply to the power apparatus, and at least one first blocking and passing component which is configured to selectively channel energy from the main power supply to charge the at least one first input capacitor during a time when the at least one part of the at least one first power supply is enabled, and channel energy from the at least one first input capacitor to the at least one second power supply during a time when the at least one part of the at least one first power supply is disabled.

There is also provided in accordance with another embodiment of the present disclosure, a method, including receiving power in at least one first power supply from a main power supply, smoothing voltage ripples and storing energy using at least one first input capacitor of the at least one first power supply, receiving power in at least one second power supply from the main power supply, monitoring a voltage provided by the main power supply, causing enablement and/or disablement of at least one part of the at least one first power supply the voltage provided by the main power supply, channeling energy from the main power supply to charge the at least one first input capacitor during a time when the at least one part of the at least one first power supply is enabled, and channeling energy from the at least one first input capacitor to the at least one second power supply during a time when the at least one part of the at least one first power supply is disabled.

DETAILED DESCRIPTION

Figure 1:
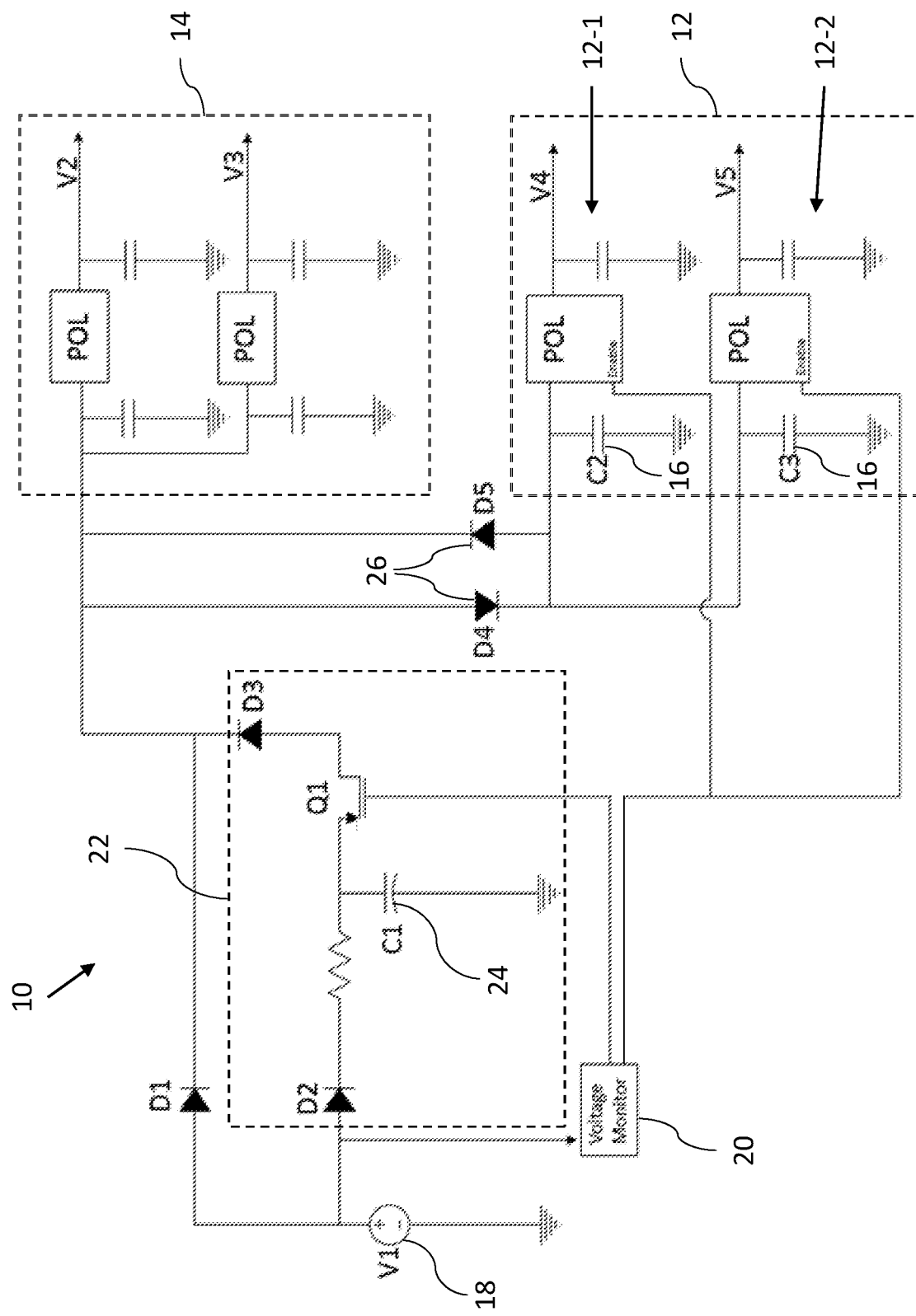
FIG. 1 is a view of an exemplary circuit diagram of a power apparatus constructed and operative in accordance with an embodiment of the present disclosure.

Reference is now made to FIG. 1, which is a view of an exemplary circuit diagram of a power apparatus 10 constructed and operative in accordance with an embodiment of the present disclosure. The power apparatus 10 is described in overview with reference to FIG. 1, below.

The power apparatus 10 includes a first plurality of power supplies 12 and a second plurality of power supplies 14. The first plurality of power supplies 12 and the second plurality of power supplies 14 are configured to receive power from a main power supply 18. The second plurality of power supplies 14 provides power for a dying gasp event (e.g., dying gasp transmission and/or other dying gasp process) on output lines V2 and V3. The first plurality of power supplies 12 provides power for non-critical processes on output lines V4 and V5. Each of the first plurality of power supplies 12 includes an input capacitor 16 for smoothing ripples and storing energy. The input capacitor 16 of one of the first plurality of power supplies 12, namely power supply 12-1, is labeled C2. The input capacitor 16 of another one of the first plurality of power supplies 12, namely power supply 12-2, is labeled C3. Energy is stored in the input capacitors 16 of the first plurality of power supplies 12 during a time when the main power supply 18 (also labeled as V1 in FIG. 1) is supplying power to the power apparatus 10. Subsequently, the energy stored in the input capacitors 16 is channeled to the second plurality of power supplies 14 to provide energy for a dying gasp event after the main power supply 18 fails. Each of the first plurality of power supplies 12 includes a point of load (POL) 40, which may include a voltage step-up or step-down arrangement, by way of example only. Each of the second plurality of power supplies 14 includes a point of load (POL) 36, which may include a voltage step-up or step-down arrangement, by way of example only.

The power apparatus 10 also includes blocking and passing components 26. The blocking and passing components 26 are configured to selectively channel energy from the main power supply 18 to the first plurality of power supplies 12, and from the input capacitors 16 of the first plurality of power supplies 12 to the second plurality of power supplies 14 after a failure of the main power supply 18. The blocking and passing components 26 are implemented as two diodes D4 and D5 in FIGS. 1-3. FIG. 4 shows an alternative embodiment, which uses transistors and an optional inverter instead of the diodes D4 and D5. It will be appreciated that the blocking and passing components 26 may also be implemented using a single electrical component such as an integrated circuit (IC) chip, by way of example only. A blocking and passing component may be any suitable, active or passive, blocking and passing component such as: a diode, which blocks in one direction and passes in another direction; or a transistor, which selectively, blocks in two directions, and selectively, passes in one direction and blocks in the other direction; or a suitably configured IC chip.

The power apparatus 10 includes a voltage monitor 20, which monitors the voltage level in the power apparatus 10 supplied by the main power supply 18. The voltage monitor 20 is configured to cause the points of load 40 (and/or any other part) of the first plurality of power supplies 12 to be disabled when the main power supply 18 fails so that the first plurality of power supplies 12 does not draw power during the dying gasp event.

The power apparatus 10 also includes a hold-up circuit 22 including a storage capacitor 24, which is also labeled as C1 in FIG. 1. The storage capacitor 24 (C1) is configured to store energy supplied by the main power supply 18 when the main power supply 18 (also labeled as V1 in FIG. 1) is supplying power to the power apparatus 10. Energy stored in the storage capacitor 24 (C1) is subsequently channeled to the second plurality of power supplies 14 to also provide energy for the dying gasp event after the main power supply 18 fails.

The power apparatus 10 minimizes power consumption by using the energy stored in the input capacitors 16 (which would otherwise have been wasted) for providing energy during the dying gasp event as well as disabling the points of load 40 (and/or any other part) of the first plurality of power supplies 12 during a failure of the main power supply 18. Minimizing power consumption and a smaller footprint (i.e. using less board space) is advantageous for many devices, for example, but not limited to, Internet of Things (IoT) devices, mobile phones, tablet devices, and other devices or equipment in which the power apparatus 10 is implemented. The power apparatus 10 is now described below in more detail.

Figure 2:
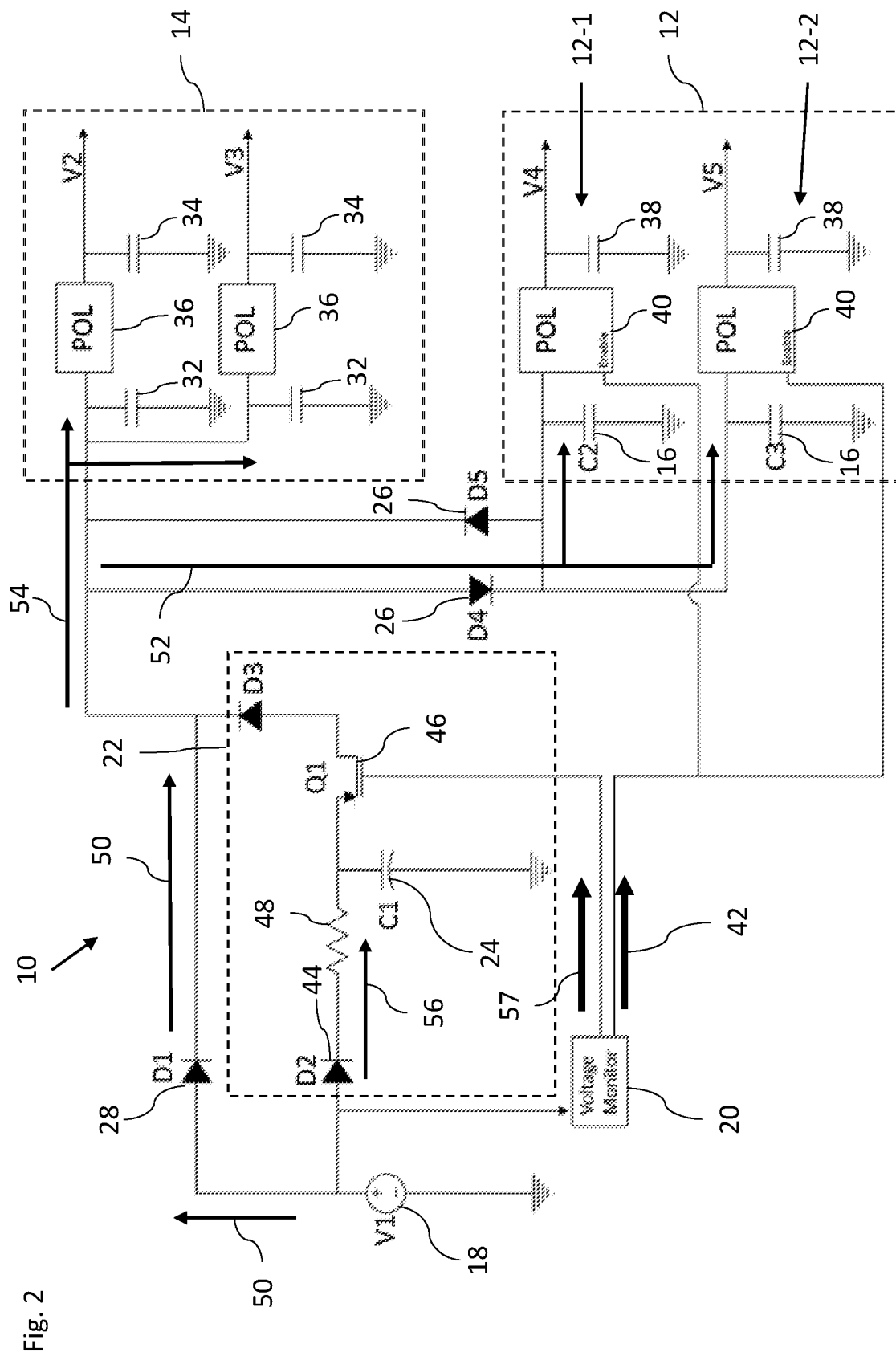
FIG. 2 is a view of the power apparatus of FIG. 1 illustrating a first mode of operation of the power apparatus.

Reference is now made to FIG. 2, which is a view of the power apparatus 10 of FIG. 1 illustrating a first mode of operation of the power apparatus. FIG. 2 illustrates power delivery in the power apparatus 10 during normal operation.

Each of the first plurality of power supplies 12 also includes an output capacitor 38 in addition to the input capacitor 16 (C2, C3). Two power supplies 12 have been shown in FIGS. 1-3 by way of example only. It will be appreciated that any suitable number (for example, one, two, or more than two) of power supplies 12 may be implemented in the power apparatus 10.

The input capacitor 16 (C2, C3) of each power supply 12 is utilized to both smooth voltage ripples for the first plurality of power supplies 12 and also store energy for the dying gasp event. The input capacitor 16 (C2, C3) may be implemented using any suitable type of capacitor, for example, but not limited to, a ceramic or a polymer based capacitor. The capacitance of the input capacitor 16 (C2, C3) may be increased over the capacitance needed for smoothing in order to provide extra storage for energy used in the dying gasp event. The physical size of the input capacitor 16 (C2, C3) may be limited by available space on a circuit board, financial considerations, and/or smoothing requirements. For example, small capacitors may be more efficient for filtering high frequencies, thereby limiting the size of the input capacitor 16 (C2, C3). It should be noted that the power supplies 12 might include more than one input capacitor 16 for each power supply 12 arranged parallel to each other and to the respective point of load 40.

Each of the second plurality of power supplies 14 includes an input capacitor 32 to smooth voltage ripples. Each of the second plurality of power supplies 14 also includes an output capacitor 34. The second plurality of power supplies 14 are configured to supply power to at least one dying gasp event described in more detail with reference to FIG. 3. Two power supplies 14 have been shown in FIGS. 1-3 by way of example only. It will be appreciated that any suitable number (for example, one, two, or more than two) of power supplies 14 may be implemented in the power apparatus 10.

The voltage monitor 20 is configured to monitor voltage provided by the main power supply 18 to the power apparatus 10. The main power supply 18 may be an intermediate or main power source. The voltage monitor 20 is configured to cause enablement and/or disablement of the points of load 40 (and/or any other part) of the power supplies 12 according to a voltage provided by the main power supply 18 to the power apparatus 10. The voltage monitor 20 may be implemented using an IC (or any other suitable component or components) that monitors voltage supplied by the main power supply 18 with reference to a threshold voltage. In response to the voltage monitor 20 determining that the main power supply 18 is providing adequate voltage (above the threshold) to the power apparatus, the voltage monitor 20 is configured to provide a signal 42 to the power supplies 12 to cause enablement of the points of load 40 (and/or any other part) of the power supplies 12.

Once the points of load 40 are enabled, the power supplies 12 draw current from the main power supply 18. The power supplies 12 are configured to receive power from the main power supply 18 via a blocking and passing component 28 (e.g., a diode which is also labeled D1 in FIG. 2) (arrows 50) and via the diode D4 of the blocking and passing components 26 (arrows 52). The diode D4 is configured to connect the main power supply 18 to the power supplies 12. In particular, during a time when the main power supply 18 is providing adequate voltage to the power apparatus 10 and the points of load 40 (and/or any other part) of the first plurality of power supplies 12 are enabled, the diode D4 is forward biased and is configured to channel energy from the main power supply 18 to each power supply 12. During a time when the diode D4 is forward biased, the input capacitor 16 (C2, C3) of each power supply 12 is being charged by the main power supply 18. The second plurality of power supplies 14 are configured to receive power from the main power supply 18 via the blocking and passing component 28 (D1) (arrows 50, 54).

The hold-up circuit 22 also includes a blocking and passing component 44 (e.g., a diode, which is also labeled D2 in FIG. 2), a blocking and passing component 46 (e.g., a transistor, which is also labeled Q1 in FIG. 2), and a resistor 48. The storage capacitor 24 (C1) is configured to charge from the main power supply 18 via the blocking and passing component 44 (D2) and the resistor 48 (arrow 56). The blocking and passing component 44 (D2) is shown as a diode D2 in FIG. 2. The blocking and passing component 44 (D2) is described in more detail with reference to FIG. 3. The storage capacitor 24 (C1) charges up to the nominal voltage of the main power supply 18. The storage capacitor 24 (C1) is shown as an electrolytic capacitor in FIG. 2. However, it will be appreciated that storage capacitor 24 (C1) may be any suitable capacitor, for example, but not limited to a super capacitor. The storage capacitor 24 (C1)

may have any suitable capacitance and is typically in the micro Farad or Farad range, by way of example only. The hold-up circuit 22 may include two or more storage capacitors 24 (C1) arranged in parallel. The blocking and passing component 46 (Q1) is configured, typically under control of the voltage monitor 20, to be off and on to selectively prevent discharge, and allow discharge, respectively, of energy stored in the storage capacitor 24 (C1) to the power supplies 14. When the main power supply 18 is supplying adequate voltage to the power apparatus 10, the blocking and passing component 46 (Q1) remains off preventing discharge of the storage capacitor 24 (C1). The blocking and passing component 46 (Q1) is shown in FIG. 2 as a p-channel metal-oxide-semiconductor field-effect transistor (MOSFET). It will be appreciated that the blocking and passing component 46 (Q1) may be implemented using any suitable transistor or IC chip by way of example only. The voltage monitor 20 is configured to cause the selective switching of the blocking and passing component 46 (Q1) based on a signal 57 applied at an input (e.g., gate) of the blocking and passing component 46 (Q1). The voltage monitor 20 typically monitors the voltage (e.g., at the source) of the blocking and passing component 46 (Q1) to generate the signal 57 at the correct voltage to achieve the correct switching of the blocking and passing component 46 (Q1). The blocking and passing component 46 (Q1) and the points of load 40 may be controlled by the same signal from the monitor 20 if the signal provided by the monitor 20 is level shifted according to whatever voltage is needed to control the blocking and passing component 46 (Q1) correctly. Level shifting may be provided by any suitable arrangement of components including transistors and resistors as known in the art. It will be appreciated that the hold-up circuit 22 is but one example of a suitable hold-up circuit and that the hold-up circuit 22 may be replaced by any suitable hold-up circuit.

Figure 3:
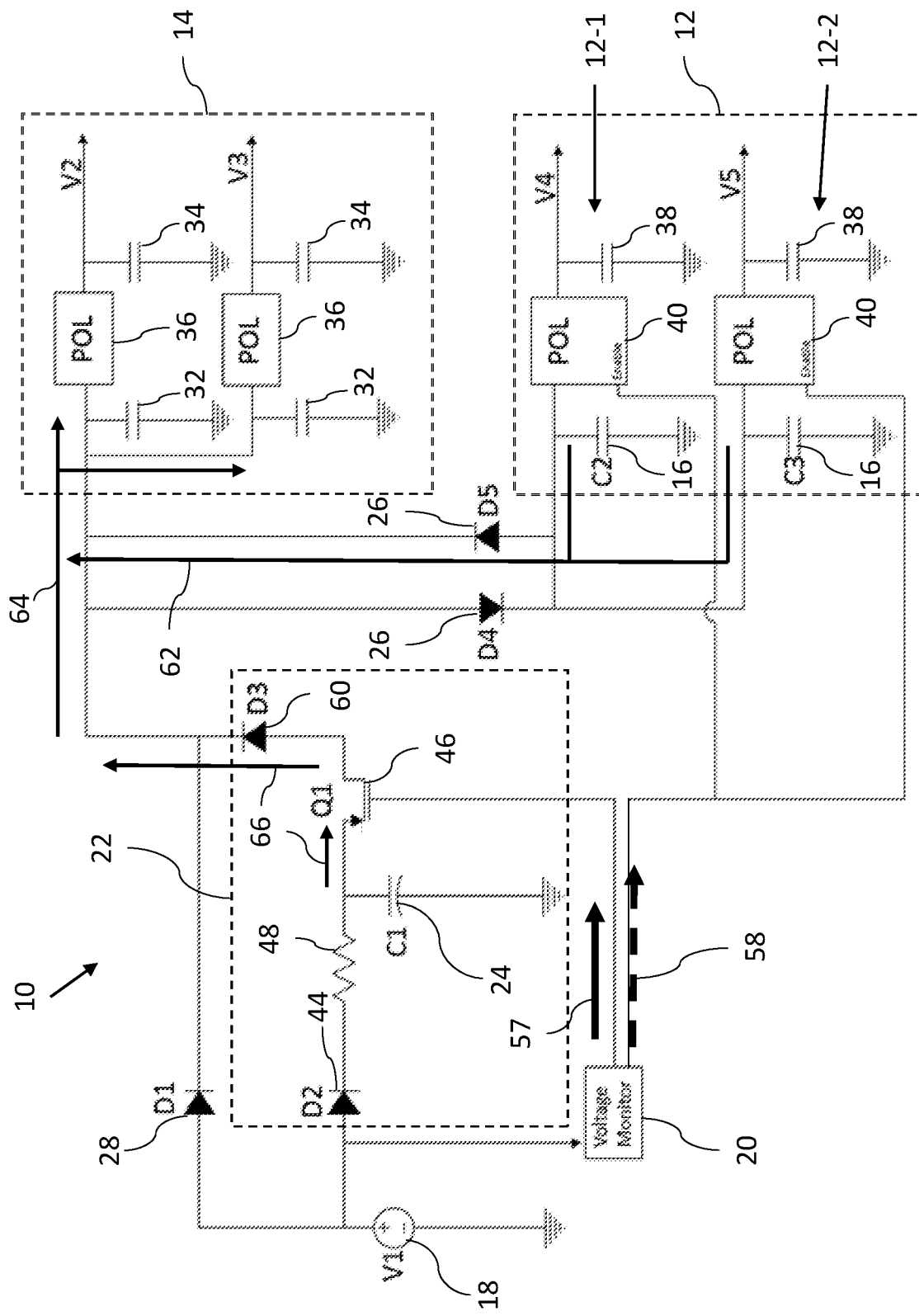
FIG. 3 is a view of the power apparatus of FIG. 1 illustrating a second mode of operation of the power apparatus.
Figure 4:
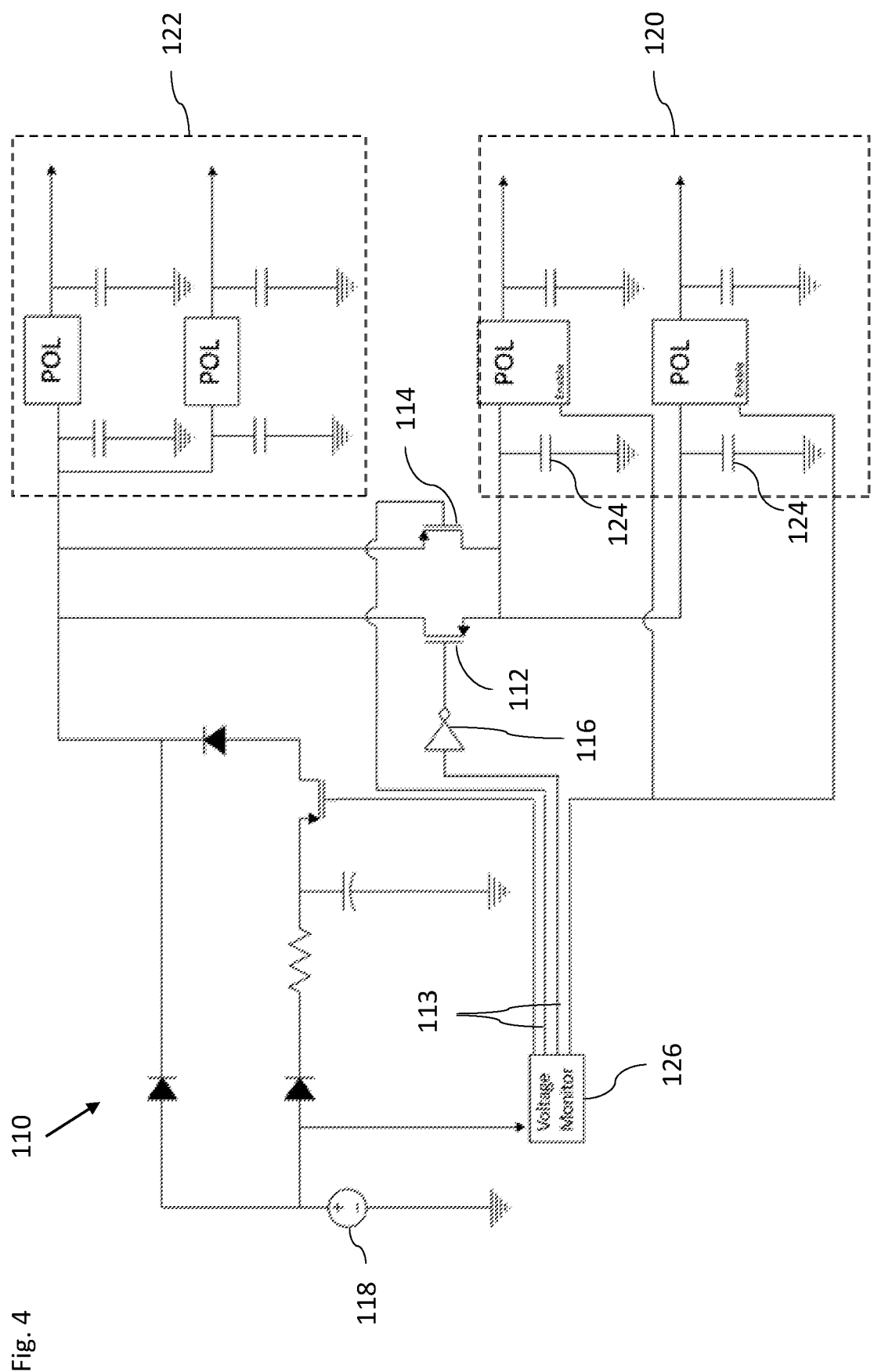
FIG. 4 is a view of an exemplary circuit diagram of a power apparatus constructed and operative in accordance with an alternative embodiment of the present disclosure.

Reference is now made to FIG. 3, which is a view of the power apparatus 10 of FIG. 1 illustrating a second mode of operation of the power apparatus. FIG. 3 depicts the operation of the power apparatus 10 after the main power supply 18 fails. In overview, on detecting a power failure (for example, the voltage in the power apparatus 10 falls below a threshold), the voltage monitor 20 adjusts the signal 57, which closes the blocking and passing component 46 (Q1) (which allows the storage capacitor 24 (C1) to discharge to the power supplies 14). The monitor 20, on detecting the power failure, also generates a signal 58, which causes the points of load 40 of the power supplies 12 that are not critical for dying gasp transmission to be disabled. It should be noted that the power supplies 12 might still draw quiescent current even when disabled. Once the power supplies 12 are shut off, the diode D5 becomes forward biased and the energy stored in the input capacitors 16 is discharged and channeled to the critical power supplies 14 through the diode D5. The flow during a power failure is now described in more detail below.

In response to the voltage monitor 20 determining that the main power supply 18 is not providing adequate voltage to the power apparatus 10 (e.g., the voltage measured in the power apparatus 10 by the voltage monitor 20 falls below a certain threshold), the voltage monitor 20 is configured to discontinue providing the signal 42 and start providing the signal 58 to the power supplies 12 to cause disablement of the points of load 40 (and/or any other part) of the power supplies 12. The voltage monitor 20 may also provide the signal 58 or another signal to the second plurality of power supplies 14 to inform the second plurality of power supplies 14 that the main power supply 18 has failed, thereby giving the second plurality of power supplies 14 notice to perform the dying gasp event and/or any other shutdown processing. The signal 58 may be sent once, repeated periodically, or may be a continuous signal.

In accordance with an alternative embodiment, in response to the voltage monitor 20 determining that the main power supply 18 is not providing adequate voltage to the power apparatus 10, the voltage monitor 20 is configured to discontinue providing the signal 42 without providing the signal 58. In accordance with this alternative embodiment, the points of load 40 (and/or any other part) of the power supplies 12 are configured to disable themselves based on an absence of the signal 42.

The diode D5 of the blocking and passing components 26 is configured to connect the input capacitors 16 of the power supplies 12 with the power supplies 14. The points of load 40 of the power supplies 12 being disabled leads to a voltage in the input capacitors 32 of the power supplies 14 dropping faster than the voltage in the input capacitors 16 of the power supplies 12 thereby causing the diode D5 to be forward biased. Therefore, the diode D5 of the blocking and passing components 26 is configured to channel energy from the input capacitors 16 (C2, C3) to the power supplies 14 (arrows 62, 64) during a time when the main power supply 18 is not providing adequate voltage to the power apparatus 10 and the points of load 40 (and/or any other part) of the first plurality of power supplies 12 are disabled. In other words, during a time when the diode D5 is forward biased, the input capacitors 16 are discharged to the power supplies 14 via the diode D5. The blocking and passing component 28 (D1) is configured to inhibit the input capacitors 16 (C2, C3) discharging towards the main power supply 18. The term "inhibit" as used in the specification and claims, is defined to include blocking current flow apart from a reverse leakage current that may inherently not be blocked by a blocking and passing component.

The monitor 20 is also configured to adjust the signal 57 applied at the gate of Q1 to control Q1 and therefore control charging and discharging of the storage capacitor 24 (C1). Therefore, the blocking and passing component 46 (Q1) is configured to selectively, under control of the voltage monitor 20, allow discharge of energy stored in the storage capacitor 24 (C1) to the power supplies 14 via a blocking and passing component 60 (e.g., diode D3) (arrows 66, 64). The blocking and passing component 44 (D2) is configured to inhibit the storage capacitor 24 (C1) from discharging towards the main power supply 18. The blocking and passing component 60 (D3) is configured to inhibit the input capacitors 16 (C2, C3) from discharging to the storage capacitor 24 (C1) of the hold-up circuit 22. It will be appreciated that any of diodes D1 to D5 may be replaced by transistors with a suitable control scheme. Operation of the voltage monitor 20 including generating the signals 57 and 58, when the main power supply 18 has failed, may be supported by the stored charge in the storage capacitor 24 (C1).

In accordance with an alternative embodiment, the blocking and passing component 46 (Q1) may be implemented as an n-type or n-channel transistor.

Reference is now made to FIG. 4, which is a view of an exemplary circuit diagram of a power apparatus 110 constructed and operative in accordance with an alternative embodiment of the present disclosure. The power apparatus 110 is substantially the same as the power apparatus 10 of FIGS. 1-3 except that the diodes D4 and D5 of the blocking and passing component 26 are replaced by a transistor 112, a transistor 114, and an inverter 116. The transistor 112 is configured to connect a main power supply 118 to a plurality of (non-dying gasp event) power supplies 120. The transistor 114 is configured to connect the power supplies 120 with a plurality of (dying gasp event) power supplies 122. Each of the power supplies 120 includes an input capacitor 124 for storing energy and smoothing ripples while the main power supply 118 is providing an adequate voltage in the power apparatus 110. The stored energy in the input capacitors 124 is later channeled to the power supplies 122 when the main power supply 118 fails. It will be appreciated that the main power supply 118, the power supplies 120, the power supplies 122, and the input capacitors 124 generally correspond to the main power supply 18, the first plurality of power supplies 12, the second plurality of power supplies 14, and the input capacitors 16 of the power apparatus 10 of FIGS. 1-3, respectively.

Output lines 113 of a voltage monitor 126 (which generally corresponds to the voltage monitor 20 of the power apparatus 10 of FIGS. 1-3) are connected to the input of the inverter 116 and the gate of the transistor 114. The output of the inverter 116 is connected to the gate of the transistor 112. The voltage monitor 126 is configured to cause the selective switching of the transistor 112 and the transistor 114 according to whether the main power supply 118 is, or is not, providing adequate voltage to the power apparatus 110. The voltage monitor is configured to cause the selective switching of the transistor 112 and the transistor 114 based on signals applied on the output lines 113 by the voltage monitor 126 to the gate of the transistor 114 and the input of the inverter 116. It will be appreciated that the inverter 116 is optional and the voltage monitor 126 may be directly connected to the gate of the transistor 112. When the main power supply 118 is operational, the monitor 126 outputs signals causing the transistor 112 to be off and the transistor 114 to be on. When the main power supply 118 fails, the monitor 126 outputs signals causing the transistor 112 to be on and the transistor 114 to be off. It will be appreciated that during a time when the transistor 114 is on, the input capacitors 124 are charged by the main power supply 118, and during a time when the transistor 112 is on, the input capacitors 124 are discharged to the power supplies 122.

The voltage monitor 126 typically monitors the voltage at the source of all the transistors to generate the signals at the correct voltage to achieve the correct switching of the transistors. All the transistors (and optionally the points of load (POL) of the power supplies 120) may be controlled by a different signal (as shown in FIG. 4) from the voltage monitor 126 or by the same signal from the voltage monitor 126 if the signal provided by the voltage monitor 126 is level shifted according to whatever voltage is needed to control the transistors correctly.

FIG. 4 shows p-channel MOSFETs being used for the transistors 112, 114. It will be appreciated that any suitable transistor may be used instead. For example, the transistor 112 may be replaced by an n-channel or n-type transistor without using the inverter 116. Alternatively, two n-channel or n-type transistors may be used with one inverter 116 feeding each transistor 112, 114. It will be appreciated by one ordinarily skilled in the art that the various options for the transistors and inverters are many.

In accordance with some embodiments, the inverter 116 may feed the gate of the p-channel transistor 114 instead of the gate of the p-channel transistor 112. Alternatively, the transistors 112, 114 may be implemented using re-channel transistors and the inverter 116 may feed the transistor 112 and not the transistor 114. Alternatively, the transistor 112 may be implemented using a p-channel or p-type transistor and the transistor 114 may be implemented using an re-channel or n-type transistor and the inverters 116 are not needed. It will be appreciated by one ordinarily skilled in the art that the various options for the transistors and inverters are many.

Figure 5:
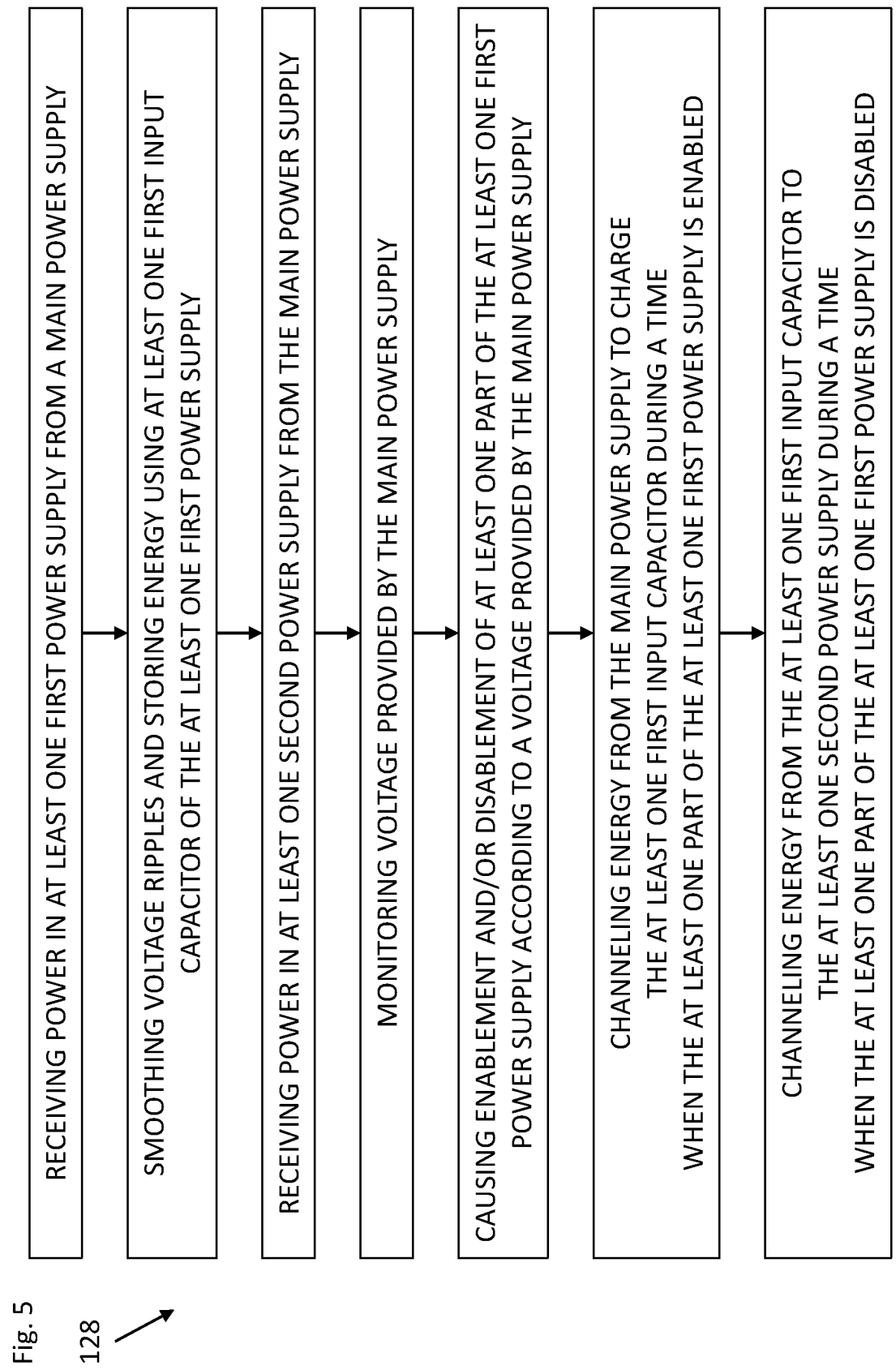
FIG. 5 is a flow chart including exemplary steps in a method of operation of the power apparatuses of FIGS. 1 and 4.

Reference is now made to FIG. 5, which is a flow chart 128 including exemplary steps in a method of operation of the power apparatuses 10, 110 of FIGS. 1 and 4. The steps shown in FIG. 5 will be easily understood based on the above description of FIGS. 1-4.

In practice, some or all of the functions of the voltage monitor 20 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A power apparatus, comprising:
at least one first power supply configured to receive power from a main power supply, the at least one first power supply including at least one first input capacitor to smooth voltage ripples and store energy;
at least one second power supply configured to receive power from the main power supply;
a voltage monitor configured to monitor a voltage provided by the main power supply to the power apparatus, the voltage monitor being configured to cause enablement and/or disablement of at least one part of the at least one first power supply according to the voltage provided by the main power supply to the power apparatus; and
at least one first blocking and passing component which is configured to selectively:

channel energy from the main power supply to charge the at least one first input capacitor when the at least one part of the at least one first power supply is enabled; and channel the energy from the at least one first input capacitor to the at least one second power supply when the at least one part of the at least one first power supply is disabled, wherein the at least one first blocking and passing component comprises a first blocking and passing element and a second blocking and passing element that are connected in parallel between the at least one first input capacitor and an input capacitor of the at least one second power supply.

2. The apparatus according to claim 1, further comprising a hold-up circuit including:
a storage capacitor;
a second blocking and passing component; and
a third blocking and passing component,
wherein:
the storage capacitor is configured to charge from the main power supply;
the second blocking and passing component is configured to inhibit the storage capacitor discharging towards the main power supply; and
the third blocking and passing component is configured to selectively, under control of the voltage monitor, allow discharge of energy stored in the storage capacitor to the at least one second power supply.

3. The apparatus according to claim 2, further comprising a fourth blocking and passing component to inhibit the at least one first input capacitor discharging to the storage capacitor of the hold-up circuit.

4. A power apparatus, comprising:
at least one first power supply configured to receive power from a main power supply, the at least one first power supply including at least one first input capacitor to smooth voltage ripples and store energy;
at least one second power supply configured to receive power from the main power supply;
a voltage monitor configured to monitor a voltage provided by the main power supply to the power apparatus, the voltage monitor being configured to cause enablement and/or disablement of at least one part of the at least one first power supply according to the voltage provided by the main power supply to the power apparatus; and
at least one first blocking and passing component which is configured to selectively:
channel energy from the main power supply to charge the at least one first input capacitor when the at least one part of the at least one first power supply is enabled; and
channel the energy from the at least one first input capacitor to the at least one second power supply when the at least one part of the at least one first power supply is disabled,
wherein:
the at least one first blocking and passing component includes a first diode and a second diode;
the first diode is configured to connect the main power supply to the at least one first power supply;
the second diode is configured to connect the at least one first power supply with the at least one second power supply;

when the first diode is forward biased, the at least one first input capacitor is being charged by the main power supply; and
when the second diode is forward biased, the at least one first input capacitor is being discharged to the at least one second power supply.

5. The apparatus according to claim 4, wherein:
the at least one second power supply includes at least one second input capacitor; and
the second diode is forward biased as a result of the at least one part of the at least one first power supply being disabled and a voltage in the at least one second input capacitor of the at least one second power supply is dropping faster than the voltage in the at least one first input capacitor of the at least one first power supply.

6. The apparatus according to claim 3, further comprising:
a fifth blocking and passing component to inhibit the at least one first input capacitor discharging towards the main power supply.

7. The apparatus according to claim 1, wherein:
the at least one first blocking and passing component includes a first transistor and a second transistor;
the first transistor is configured to connect the main power supply to the at least one first power supply;
the second transistor is configured to connect the at least one first power supply with the at least one second power supply;
when the first transistor is on, the at least one first input capacitor is being charged by the main power supply;
when the second transistor is on, the at least one first input capacitor is being discharged to the at least one second power supply; and
the voltage monitor is configured to cause selective switching of the first transistor and the second transistor.

8. The apparatus according to claim 7, wherein the at least one first blocking and passing component includes an inverter connected to the first transistor or the second transistor.

9. The apparatus according to claim 1, wherein each power supply of the at least one first power supply and the at least one second power supply includes a point of load.

10. The apparatus according to claim 9, wherein the point of load includes a voltage step-up or step-down arrangement.

11. The apparatus according to claim 1, wherein the at least one second power supply is configured to supply power to at least one dying gasp event when the main power supply fails.

12. The apparatus according to claim 1, wherein, in response to the voltage monitor determining that the main power supply is providing adequate voltage to the power apparatus, the voltage monitor is configured to transmit a signal to the at least one first power supply to cause enablement of the at least one part of the at least one first power supply.

13. The apparatus according to claim 12, wherein:
the at least one first blocking and passing component includes a first transistor and a second transistor;
the first transistor is configured to connect the main power supply to the at least one first power supply;
the second transistor is configured to connect the at least one first input capacitor with the at least one second power supply;

the voltage monitor is configured to cause selective switching of the first transistor and the second transistor based on at least one signal applied to the first transistor and the second transistor;

when the first transistor is on, the at least one first input capacitor is being charged by the main power supply; and when the second transistor is on, the at least one first input capacitor is being discharged to the at least one second power supply.

14. The apparatus according to claim 12, further comprising a hold-up circuit including:
a storage capacitor; a second blocking and passing component; and a third blocking and passing component, wherein:
the storage capacitor is configured to charge from the main power supply;
the second blocking and passing component is configured to inhibit the storage capacitor discharging towards the main power supply;
the third blocking and passing component is configured to be off and on to selectively prevent discharge, and allow discharge, respectively, of energy stored in the storage capacitor to the at least one second power supply; and
the voltage monitor is configured to cause selective switching of the third blocking and passing component based on a signal applied to the third blocking and passing component.

15. The apparatus according to claim 1, wherein:
the at least one first blocking and passing component includes a first transistor and a second transistor;
the first transistor is configured to connect the main power supply to the at least one first power supply;
the second transistor is configured to connect the at least one first input capacitor with the at least one second power supply;
the voltage monitor is configured to cause selective switching of the first transistor and the second transistor based on at least one signal applied to the first transistor and the second transistor;
when the first transistor is on, the at least one first input capacitor is being charged by the main power supply; and
when the second transistor is on, the at least one first input capacitor is being discharged to the at least one second power supply.

16. The apparatus according to claim 1, further comprising a hold-up circuit including: a storage capacitor; a second blocking and passing component; and a third blocking and passing component, wherein:
the storage capacitor is configured to charge from the main power supply;
the second blocking and passing component is configured to inhibit the storage capacitor discharging towards the main power supply;
the third blocking and passing component is configured to be off and on to selectively prevent discharge, and allow discharge, respectively, of energy stored in the storage capacitor to the at least one second power supply; and
the voltage monitor is configured to cause selective switching of the third blocking and passing component based on a signal applied to the third blocking and passing component.

17. The apparatus according to claim 1, wherein the input capacitor of the at least one second power supply is configured to-smooth the voltage ripples.

18. The apparatus according to claim 1,
wherein each of the first blocking and passing element and the second blocking and passing element is configured to block the energy in at least one direction.

19. A method, comprising:
receiving power in at least one first power supply from a main power supply;
smoothing voltage ripples and storing energy using at least one first input capacitor of the at least one first power supply;
receiving power in at least one second power supply from the main power supply;
monitoring a voltage provided by the main power supply;
causing enablement and/or disablement of at least one part of the at least one first power supply according to a voltage provided by the main power supply;
channeling energy from the main power supply via a first blocking and passing element to charge the at least one first input capacitor when the at least one part of the at least one first power supply is enabled; and
channeling the energy from the at least one first input capacitor via a second blocking and passing element to the at least one second power supply when the at least one part of the at least one first power supply is disabled,
wherein the first blocking and passing element and the second blocking and passing element are connected in parallel between the at least one first input capacitor and an input capacitor of the at least one second power supply.

20. The method of claim 19, wherein channeling the energy from the main power supply via the first blocking and passing element to charge the at least one first input capacitor includes connecting, via a first diode or a first transistor, the main power supply to the at least one first power supply to charge the at least one first input capacitor and power at least one point of load of the at least one first power supply, and
wherein channeling the energy from the at least one first input capacitor via the second blocking and passing element to the at least one second power supply includes connecting, via a second diode or a second transistor, the at least one second power supply with the at least one first power supply and when the main power supply is shutoff, disabling the at least one point of load of the at least one first power supply and channeling the energy from the at least one first input capacitor to the at least one second power supply.

* * * * *